UNITED STATES PATENT OFFICE.

LEOPOLD SCHEPP, OF NEW YORK, N. Y.

COCOANUT COMPOUND.

SPECIFICATION forming part of Letters Patent No. 398,082, dated February 19, 1889.

Application filed December 15, 1888. Serial No. 293,719. (No specimens.)

*To all whom it may concern:*

Be it known that I, LEOPOLD SCHEPP, of the city, county, and State of New York, have invented a new and useful Improvement in Food Compounds, of which the following is a full, clear, and exact description.

The object of my invention is to produce a special dry food compound, the ingredients of which shall be so prepared and proportioned as that the article will be ready—that is, upon short notice and with but little trouble and expense—for immediate use by the purchaser or consumer, and with much greater convenience and less waste and the whole be much more correctly prepared than if the ingredients were separately purchased and afterward mixed by the consumer.

Supposing the amount of the compound to be made at one time to be one hundred pounds, (but it is proposed to make it in larger quantities,) I then mix with about thirty pounds of granulated dried cocoanut about thirty pounds of pulverized sugar, thirty pounds, or thereabout, of granulated tapioca, about six pounds of granulated baked corn, two pounds, or thereabout, of cream of tartar, about one pound of dried or pulverized gelatine, and one pound, or thereabout, of seasoning and flavoring material, consisting of salt and lemon or other flavoring extract in about the proportion of two-fifths salt to three-fifths of the flavoring extract, more or less. The dried or desiccated cocoanut is granulated to about the size of granulated sugar and the tapioca granulated to about the same size. All of these ingredients are put into a dasher mixing-machine and thoroughly mixed for, say, twenty minutes, or until the preparation is perfectly blended together, after which it is passed to cooling-tables to cool, and subsequently put up into small-sized air and water tight paper packages for family use and into larger-sized packages for hotel use and other purposes. The reduced or granulated ingredients will readily absorb milk or milk and beaten eggs, so that when thus mixed and the whole is put on top of a stove for a few minutes and stirred thoroughly until thoroughly thickened, taking care not to scorch or boil, the mass may then be put into a pudding-pan and be baked slowly on the slide in the oven and a superior cocoanut-tapioca pudding be produced.

When the compound is mixed with milk, the granulated baked corn will act to thicken the milk and to take up the oil of the cocoanut, the cream of tartar to lighten the mass, and the dried and pulverized gelatine to hold up and further lighten it, so that it will not fall flat or be heavy after it cools.

The compound is ready for use without any additional mixing, excepting when introducing the milk and the beaten eggs. It may be used either as a pudding or pie-filling or for other purposes, but is mainly intended to be used in making cocoanut-tapioca puddings, as above described.

Having thus described my invention, what I claim as new, and desire to secure by Letters Patent, is—

The herein-described food compound in dry and granulated form, consisting of cocoanut, sugar, tapioca, baked corn, cream of tartar, gelatine, salt, and a flavoring extract, the ingredients being in the proportions substantially as set forth.

LEOPOLD SCHEPP.

Witnesses:
 C. H. SCHULTHEIS,
 R. G. CROW.